United States Patent [19]

Dreschmann et al.

[11] Patent Number: 4,772,138
[45] Date of Patent: Sep. 20, 1988

[54] SEALED ANTIFRICTION BEARING

[75] Inventors: Peter Dreschmann, Dittelbrunn; Wilhelm Walter, Reith, both of Fed. Rep. of Germany

[73] Assignee: FAG Kugelfischer Georg Schafer (KGaA), Fed. Rep. of Germany

[21] Appl. No.: 18,602

[22] Filed: Feb. 25, 1987

[30] Foreign Application Priority Data

Mar. 7, 1986 [DE] Fed. Rep. of Germany ....... 3607535

[51] Int. Cl.$^4$ ............................................. F16C 33/78
[52] U.S. Cl. ................................... 384/488; 384/472; 384/484; 277/134
[58] Field of Search ............... 384/472, 479, 484, 488; 277/29, 3, 212 C, 165, 152, 134

[56] References Cited

U.S. PATENT DOCUMENTS

| 3,597,030 | 8/1971 | Hallerback | 384/488 |
| 4,616,836 | 10/1986 | Drygalski et al. | 277/152 |
| 4,635,946 | 1/1987 | Stanley | 277/152 |
| 4,650,195 | 3/1987 | Dreschmann et al. | 277/152 |

Primary Examiner—Lenard A. Footland
Attorney, Agent, or Firm—Ostrolenk, Faber, Gerb & Soffen

[57] ABSTRACT

A sealed antifriction bearing with an inner and outer ring and rolling elements between them includes sealing rings at both axial ends of the annular space between the rings. A sealing ring is fixed to the outer ring and rotates with it. At the inner ring, the sealing ring has a resilient sealing lip with a sealing edge adjacent the inner ring. Projections from the sealing lip project toward the inner ring and are wedge shaped and oriented such that relative rotation of the outer and inner rings causes the projections to convey lubricating oil axially into the annular space between the bearing rings. The sealing lip has a less inclined surface axially inward of the sealing edge and a more sharply inclined surface outward of the sealing edge. The projections are on the sealing lip surface axially inward of the sealing edge.

18 Claims, 2 Drawing Sheets

SEALED ANTIFRICTION BEARING

BACKGROUND OF THE INVENTION

The invention relates to a sealed antifriction bearing in which the seals at the axial ends of the bearing help convey lubricant into the bearing.

These so-called dirt-protected bearings are used, for example, in oil-lubricated gearing or environments where dirt is generated, as by friction in gearing. Seals are disposed at the axial ends of the annular space between the bearing rings. At least one annular lip of the seal is intended to form a seal at one ring of the bearing, which rotates past that lip.

Various requirements for these bearings appear at least partially contradictory. These requirements include good sealing against dirt, low moment of friction, low breakaway moment and long life.

The first requirement can be satisfied by the sealing lip being pressed with a high pressing force against the application surface of the bearing ring against which it seals. That, however, results in a high moment of friction and rapid wear. Lubrication of the sealing lip or edge, for instance, by the dirtied oil surrounding it, promotes the danger of dirtying of the bearing. To prevent this, several sealing embodiments are provided with means which return the oil outward of the seal. See, for example, Federal Republic of Germany Pat. No. 25 36 374, British Pat. No. 499,480 and Federal Republic of Germany Provisional Pat. No. AS 16 00 458. See also U.S. Pat. No. 4,399,998. Shaft seals are also known in the prior art. See U.S. Pat. Nos. 3,640,542 and 3,586,342.

In this way, the sealing off of the bearing from dirt and oil is improved. But, the breakaway moment and the moment of friction are increased. The conveying of oil out of the bearing, which is sealed off on both sides, produces a vacuum within the bearing which draws the sealing edges or lips against their application surfaces at the rotating bearing rings and thus also increases the moment of friction. The bearings become warmer in operation. When they are allowed to cool down upon stopping operation, there is a further increase in the vacuum and the sealing edges are drawn in even more firmly. This produces a high breakaway moment and a high moment of friction upon restarting.

SUMMARY OF THE INVENTION

It is therefore the object of the invention to develop a sealed antifriction bearing which satisfies the above stated requirements and avoids the disadvantages described above.

The antifriction bearing employing the present invention includes an outer ring, an inner ring within the outer ring, the rings defining facing outer and inner races, respectively, rolling elements between the rings for rolling along the races and a cage between the rings for spacing the rolling elements. Sealing is accomplished by annular seals applied to both axial ends of the bearing to close the ends of the annular space between the bearing rings for sealing the space in which the rolling elements are contained against undesired entry of material.

On at least one and preferably both of the annular, axial end seals, lubricant conveying means are defined which are shaped and designed to convey lubricant from outside the bearing and the sealing ring, past the sealing ring, into the space through which the rolling elements move. At its radial edge adjacent one of the bearing rings, and particularly adjacent the outwardly facing application surface of the inner ring, the sealing ring includes a sealing lip which is at the bearing ring for completing the seal there. In particular, the sealing ring rotates relatively to the bearing ring at which the sealing lip is located. Typically, the sealing ring is securely held to one ring, e.g. to the outer bearing ring, so that it rotates along with the outer ring, with respect to the other, inner ring.

At the sealing lip of the sealing ring at the surface of the other, inner ring, oil conveying means are disposed, so that lubricating oil is conveyed through the space between the inner ring and the sealing lip toward the inside of the bearing.

In one preferred embodiment, the conveying means on the sealing lip of the sealing ring comprises an array of grooves defined in the lip and arrayed around the lip and/or an array of projections defined in the lip and arrayed around the lip. The grooves and/or projections are inclined at an angle with respect to the axis of the bearing and with respect to the edge of the sealing lip which is adjacent the ring toward which the sealing lip extends. That angle is selected so that upon rotation of the bearing in the normal direction, the conveying means conveys oil past the sealing lip and into the bearing. In particular, the projections have a generally triangular or wedge shape with its inclined flanks oriented so that rotation in either direction causes the flanks of the projections that are leading in the direction of rotation to be oriented to convey oil into the bearing.

The sealing edge of the sealing lip is defined between two intersecting surfaces of the lip, which intersect at the annular sealing edge. One of the surfaces is external to the bearing and the sealing ring and the other is internal to the bearing and the sealing ring. In any cross section through the sealing ring and the lip, the angle between the sealing edge and the axis of the bearing in the direction opening into the bearing is a smaller angle. The angle between the sealing edge and the axis of the bearing, the angle opening out of the bearing, is a larger angle. As a result, the surface of the sealing lip inward of the sealing edge is generally more parallel to the axis of the bearing, than is the angle of the surface of the sealing lip external to the bearing. Also, the conveying means is defined starting at the sealing edge and extending axially inwardly of the bearing along the sealing lip surface that is inward of the sealing edge.

Because the direction of oil conveyance of the conveying means has been reversed, as compared with the prior art, and is directed toward the inside of the bearing, unexpected advantages are obtained. Pressure is built up inside the bearing, which reduces the application force of the sealing lips of the sealing rings in operation. This reduces the friction of the seals and also keeps the difference in pressure smaller upon the cooling at rest so that the sealing edges are not drawn in so firmly. Furthermore, due to the conveyance of surrounding oil into the bearing, lubrication of the sealing edges and lips and of the bearing is obtained. Surprisingly, undesirable conveyance of particles of dirt into the bearing does not take place because, within a short period of time, a condition of equilibrium is established, which is dependent upon the speed of rotation and the temperature, between the pressure produced in the bearing and the amount of oil conveyed into the bearing. At this state of equilibrium, further conveyance of oil and possibly particles of dirt into the bearing no longer takes place.

In bearing operation, the sealing edges or lips ride or float on a film of oil which is maintained constant by the internal pressure of the bearing and the conveyance pressure generated by the conveying means. By structural design of the conveying means and of the force of application of the sealing lips, the required pressure within the bearing can be adjusted to the specific conditions of speed of rotation, temperature, etc.

Other objects and features of the invention are explained below with reference to a preferred embodiment.

DESCRIPTION OF A PREFERRED EMBODIMENT

Figure 1:
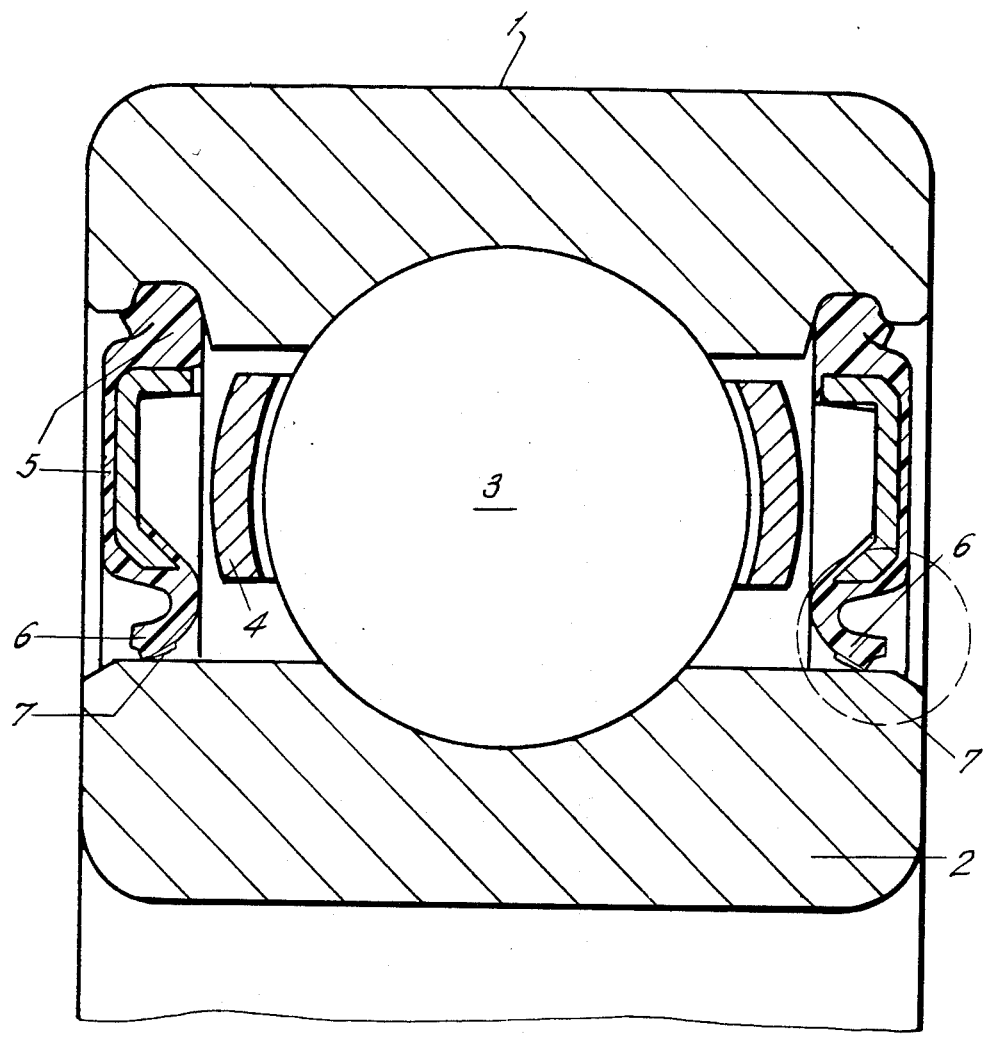
FIG. 1 shows a partial cross section through a bearing in accordance with the invention.

In FIG. 1, the radially outer ring 1 and the radially inner ring 2 of the bearing have the rolling elements 3 rolling along their facing races. The cage separator 4 placed between the rings separates the rolling elements. The antifriction bearing is sealed on both sides by annular shape, resilient material, e.g. plastic, sealing rings 5. Each sealing ring 5 has a radially outward, annular ridge which is snapped into a cooperatively shaped groove in the outer ring. The sealing ring 5 rotates together with the outer ring 1 in which it is secured.

The radially inward side of the sealing ring 5 is defined as a sealing lip 6 which rests in a sealing manner against the outward, application surface of the inner ring 2. The seal-ing lip 6 is provided with a plurality of conveyor projections or ridges 7 arrayed spaced around its curved surface and each projection is axially inward of the below described sealing edge 8 of the lip 6. That sealing edge is radially close to but is very slightly spaced from the inner ring so as not to rub it and interfere with bearing rotation. Axially inward of the sealing edge, the surface of the lip curves radially outwardly of the bearing, and the projections protrude from that surface. The direction of that conveyance is axially toward the inside of the bearing. The bearing shown may be installed in a gearing arrangement, not shown, for example. The bearing is surrounded by spray oil, for example, so that lubrication is delivered to the bearing from the exterior of the bearing and is present at the sealing lip 6.

Figure 2:
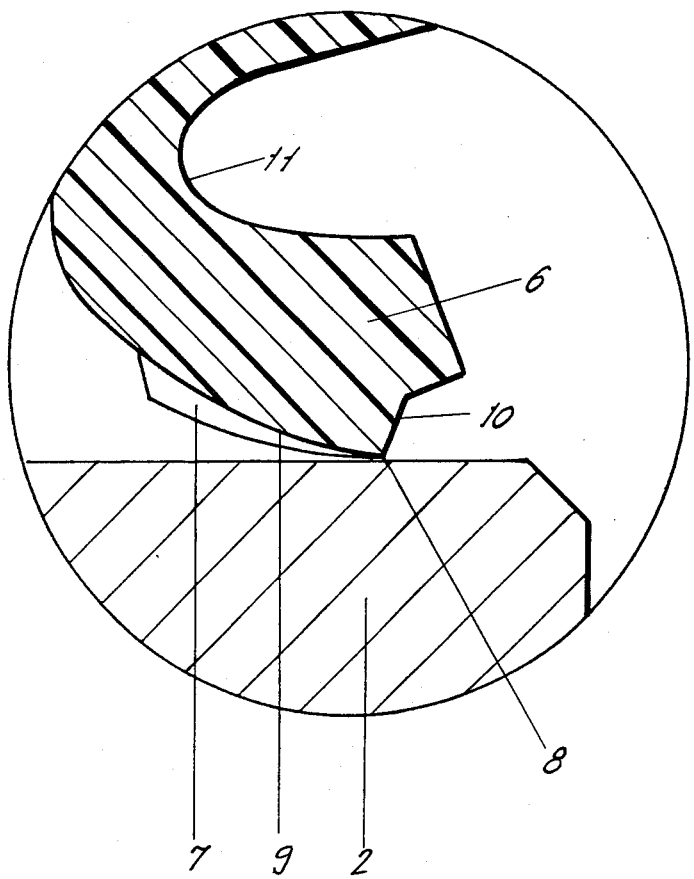
FIG. 2 shows a portion of the bearing on the sealing edge, seen in an enlarged detail view.

As shown on a larger scale in FIG. 2, the sealing lip 6 has a sealing edge 8 which is the edge of the lip closest to the outward surface of the inner ring 2. That edge 8 is defined by the meeting of two annular surfaces 9 and 10. The flatter, gradually curved surface 9 is on the axially inward side of the edge 8. The angle of incline of the surface 9 opening into the bearing more closely parallels the axis of the bearing. The surface 10 on the axially outward side of the edges has an angle of incline up from the axis of the bearing and opening out of the bearing, which is a much greater angle. This shaping of surfaces 9 and 10 tends to aid in conveying the oil particles axially inwardly past the sealing lip. Further, it produces a surface region of the lip near the edge 8 which is better able to 37 float" over the lubricant passing by the edge and which is inside the sealing lip.

Conveyor projections 7 are illustrated as ridges which project radially inwardly from the surface 9 and extend axially along that curved surface. The projections or ridges have an orientation, which is inclined with respect to the axis of the bearing in the direction along that axis, which is selected so that in a normal direction of relative rotation of the rings 1 and 2, as the sealing is carried along by the relative rotation of the ring 1 with respect to the ring 2, the conveying means moves the oil inwardly.

Figure 3:
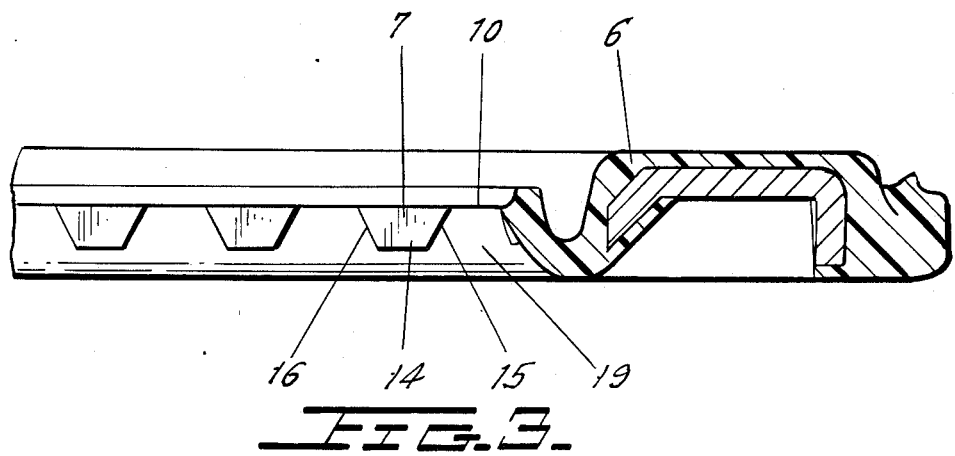
FIG. 3 shows a developed view of the sealing lip illustrating the projections.

As shown in FIG. 3, for example, each of those projections or ridges has a generally triangular or wedge shape, with its narrower end 14 pointed axially inward of the bearing so that its flanks 15, 16 are both directed to convey oil into the baring, no matter which direction the bearing rotates. Other shapes for accomplishing the same objective should be apparent.

The sealing ring has an annular groove 11 radially outward of its lip 7 so that the lip does not extend radially but itself is inclined to the axis of the bearing and to the application surface of the bearing ring 2. This gives the lip of the resilient material ring a degree of flexibility and resilience, in order that the lip might flex so that the edge 8 and the surface 9 might float on the oil at the ring 2.

While projections or ridges 7 are shown in the drawings, it should be apparent that grooves or depressions may be defined in the lip for accomplishing the oil conveying function, as those defined grooves would form projections between them. The orientation of those grooves would be comparable to that of the ridges for accomplishing the same objective.

During operation of the bearing and relative rotation of the rings 1 and 2, the projections 7 spin past the surface of ring 2. Due to the shape and orientation of the projections, the conveying projections or ridges 7 produce, in operation, a conveyance pressure with which the oil particles of the oil mist or spray at the lip 6 are first conveyed axially into the inside of the bearing. After a relatively short time, a pressure, which balances out the delivery pressure exerted by the projections, has built up within the bearing. Afterward, no further oil enters the bearing, so that there is no longer a danger of particles of dirt normally present in the bearing and generated by friction on the gearing elements entering the bearing. As a result of the pressure within the bearing, the radial force of the sealing lip against the inner ring is also reduced and thus the moment of friction is decreased as a function of the speed of rotation.

Although the present invention has been described in connection with a preferred embodiment thereof, many variations will now become apparent to those skilled in the art. It is preferred, therefore, that the present invention be limited not by the specific disclosure herein, but only by the appended claims.

What is claimed is:

1. A sealed antifriction bearing comprising
an outer bearing ring, an inner bearing ring radially inward of the outer ring and rolling elements disposed between the bearing rings for enabling relative rotation of the inner ring with respect to the outer ring; an annular space between the inner and outer rings; the annular space between the inner and outer rings having opposite axial ends at the opposite axial sides of the bearing;

a seal including a sealing ring shaped for extending into the annular space between the rings at at least one axial side of the bearing and for sealing the axial space at the respective axial side of the bearing;

at one of the bearing rings, the sealing ring having a respective sealing lip, the sealing ring and its lip being shaped so that while sealing is effective there is still sufficient space between the sealing lip and the adjacent one bearing ring for lubricating oil to pass by the sealing lip and into the annular space; at the sealing lip of the sealing ring, lubricating oil conveyor means being disposed for conveying lubricating oil from outside the sealing ring, past the sealing lip, into the annular space axially inward of the sealing ring.

2. The bearing of claim 1, wherein the sealing ring is secured to the other bearing ring for moving together with the other bearing ring with respect to the one bearing ring.

3. The bearing of claim 2, wherein the one ring is the inner ring.

4. The bearing of claim 2, wherein the sealing lip is generally curved in shape approaching the one ring generally obliquely, and is defined by an annular groove defined in the sealing ring radially outward of the sealing edge and on the axially outward side of the sealing ring, for increasing the flexibility of the sealing lip 5. The bearing of claim 1, wherein the conveying means comprises means for varying the radial height of the sealing lip on the side of the lip facing the one ring and the means for varying height being oriented on the sealing lip for directing lubricating oil past the sealing lip and into the annular space axially inward of the sealing ring.

6. The bearing of claim 5, wherein the sealing lip includes a sealing edge adjacent the one bearing ring, a first surface of the sealing lip located axially inward of the sealing edge and in the annular space, the projections being formed on the first surface and extending axially from the sealing edge over the first surface; the sealing lip having a second surface axially outward of the sealing edge and facing axially outward of the sealing ring;

the first sealing lip surface is generally inclined with respect to the axis of the bearing at a relatively smaller first angle, the first angle opening toward the annular space, and the second sealing lip surface is generally inclined with respect to the axis of the bearing at a greater second angle, the second angle opening toward the exterior of the sealing ring, whereby the angle between the sealing edge of the sealing lip and the axis of the bearing is flatter on the side of the sealing edge axially inside the annular space than on the side axially outward of the annular space.

7. The bearing of claim 6, wherein each of the projections is generally wedge shape, having flanks which are inclined toward each other and which narrows in width in the axial direction into the bearing.

8. The bearing of claim 1, wherein the means for conveying comprises projections defined on the sealing lip, generally projecting toward the one ring and the projections being shaped and oriented such that relative rotation of the one ring with respect to the sealing lip causes the projections to convey lubricating oil past the lip into the annular space.

9. The bearing of claim 8, wherein the one ring is the inner ring.

10. The bearing of claim 8, wherein each of the projections is generally wedge shape, having flanks which are inclined toward each other and which narrows in width in the axial direction into the bearing.

11. The bearing of claim 8, wherein the sealing lip includes a sealing edge adjacent the one bearing ring, a first surface of the sealing lip located axially inward of the sealing edge and in the annular space, the projections being formed on the first surface and extending axially from the sealing edge over the first surface; the sealing lip having a second surface axially outward of the sealing edge and facing axially outward of the sealing ring.

12. The bearing of claim 11, wherein the first sealing lip surface is generally inclined with respect to the axis of the bearing at a relatively smaller flat angle, the first angle opening toward the annular space, the second sealing lip surface is generally inclined with respect to the axis of the bearing at a greater second angle, the second angle opening toward the exterior of the sealing ring, whereby the angle between the sealing edge of the sealing lip and the axis of the bearing is flatter on the side of the sealing edge axially inside the annular space than on the side axially outward of the annular space.

13. The bearing of claim 12, wherein the sealing lip is generally curved in shape approaching the one ring generally obliquely, and is defined by an annular groove defined in the sealing ring radially outward of the sealing edge and on the axially outward side of the sealing ring, for increasing the flexibility of the sealing lip.

14. The bearing of claim 13, wherein each of the projections is generally wedge shape, having flanks which are inclined toward each other and which narrows in width in the axial direction into the bearing.

15. The bearing of claim 12, wherein each of the projections is generally wedge shape, having flanks which are inclined toward each other and which narrows in width in the axial direction into the bearing.

16. The bearing of claim 1, further comprising a respective one of the sealing rings at each axial side of the bearing.

17. The bearing of claim 16, wherein each sealing ring is provided with a respective conveying means.

18. The bearing of claim 1, wherein the one ring is the inner ring.

* * * * *